United States Patent
Mereaux et al.

(10) Patent No.: US 9,186,759 B2
(45) Date of Patent: Nov. 17, 2015

(54) METHOD OF FABRICATING A PART BY FORGING AND CONTROLLED POLISHING

(75) Inventors: Beryl Cassandre Anne Mereaux, Bourg la Reine (FR); Benjamin Teboul, Paris (FR)

(73) Assignee: SNECMA, Paris (FR)

(*) Notice: Subject to any disclaimer, the term of this patent is extended or adjusted under 35 U.S.C. 154(b) by 0 days.

(21) Appl. No.: 14/239,937

(22) PCT Filed: Jul. 11, 2012

(86) PCT No.: PCT/FR2012/051646
§ 371 (c)(1),
(2), (4) Date: Feb. 20, 2014

(87) PCT Pub. No.: WO2013/030475
PCT Pub. Date: Mar. 7, 2013

(65) Prior Publication Data
US 2014/0182131 A1    Jul. 3, 2014

(30) Foreign Application Priority Data
Aug. 26, 2011 (FR) .................................. 11 57548

(51) Int. Cl.
B23P 15/02 (2006.01)
B24B 19/14 (2006.01)
(Continued)

(52) U.S. Cl.
CPC .. B23P 15/02 (2013.01); B21J 5/00 (2013.01);
B21K 3/04 (2013.01); B24B 19/14 (2013.01);
B24B 21/16 (2013.01); B24B 21/165
(2013.01);
(Continued)

(58) Field of Classification Search
CPC .............. B23P 15/02; B21J 5/00; B21K 3/04;
B24B 21/16; B24B 19/14; B24B 49/183;
B24B 21/165; B24B 51/00; G01B 21/20;
G01B 7/285; G01B 7/287; Y10T 29/49996;
Y10T 29/49771; Y10T 29/49336
See application file for complete search history.

(56) References Cited

U.S. PATENT DOCUMENTS 5,193,314 A    3/1993   Wormley et al.
7,029,367 B2 * 4/2006  Bouillot et al. ................... 451/5
(Continued)

FOREIGN PATENT DOCUMENTS

DE  10 2006 019135   11/2007
WO  2010 149720     12/2010

OTHER PUBLICATIONS

International Search Report Issued Nov. 9, 2012 in PCT/FR12/051646 Filed Jul. 11, 2012.
(Continued)

Primary Examiner — Ryan J Walters
(74) Attorney, Agent, or Firm — Oblon, McClelland, Maier & Neustadt, L.L.P.

(57) ABSTRACT

A method of fabricating a part by forging, the method including: measuring geometrical characteristics of the forged part; comparing a measured shape with a theoretical shape that is to be obtained for the part; deducing therefrom zones that are not in compliance with the theoretical shape and also thicknesses of material that need to be removed from the zones that are not in compliance; and polishing the zones of the forged part that are not in compliance to remove the deduced thicknesses of material by using a controlled abrasive band. The control of the abrasive band takes account of at least one parameter representative of wear of the abrasive band during polishing of zones that are not in compliance.

9 Claims, 4 Drawing Sheets (51) Int. Cl.
*B24B 21/16* (2006.01)
*B21K 3/04* (2006.01)
*B24B 49/18* (2006.01)
*B24B 51/00* (2006.01)
*G01B 21/20* (2006.01)
*G01B 7/28* (2006.01)
*G01B 7/287* (2006.01)
*B21J 5/00* (2006.01)

(52) U.S. Cl.
CPC ............... *B24B 49/183* (2013.01); *B24B 51/00* (2013.01); *G01B 7/285* (2013.01); *G01B 7/287* (2013.01); *G01B 21/20* (2013.01); *Y10T 29/49336* (2015.01); *Y10T 29/49771* (2015.01); *Y10T 29/49996* (2015.01)

(56) References Cited

U.S. PATENT DOCUMENTS

2009/0018694 A1* 1/2009 Stammen ...................... 700/175
2012/0124834 A1* 5/2012 Cholet et al. ................. 29/889.7

OTHER PUBLICATIONS

French Search Report Issued Jun. 5, 2012 in FR 1157548 Filed Aug. 26, 2011.

* cited by examiner

METHOD OF FABRICATING A PART BY FORGING AND CONTROLLED POLISHING

The present invention relates to a method of fabricating a part by forging.

The invention relates more particularly to fabricating titanium alloy blades of large size, such as turbojet fan blades, and to finishing them with the shape of a semi-finished part obtained by forging being brought into compliance by an abrasive polishing operation.

Turbojet fan blades are generally produced by precision forging. Precision forging consists in successively stamping a blank in appropriate dies until a semi-finished part is obtained that presents shape and dimensional characteristics that are close to those of the finished part. For a semi-finished fan blade obtained by forging, its airfoil does not comply with the geometrical characteristics that are to be obtained because the dimensional tolerances to be complied with are small. By way of example, the geometrical characteristics of the airfoil include twists, i.e. turning of successive sections of the airfoil along the stacking axis, sweep, i.e. curving of the blade relative to the stacking axis and to reference points, undulation, and shape defects.

It is therefore necessary to bring the airfoil into compliance. Overall, that consists in correcting the profile of its suction side and of its pressure side by removing material from locations of the airfoil that present extra thickness compared with a theoretical profile. With precision forging, the correction relates to removing extra thickness that might amount to several tenths of a millimeter, generally lying in the range 0.4 millimeters (mm) to 0.7 mm.

For this purpose, a number of points are determined that correspond to the theoretical profile and that are distributed in an array extending along the axis of the airfoil and between its leading edge and its trailing edge. The geometrical characteristics of the semi-finished blade are measured at these points by using a three-dimensional feeler. Patent EP 1 596 156 in the name of the Applicant describes such a feeler. The difference is thus known between the theoretical shape that is to be obtained and the real shape of the airfoil.

In the prior art, there follows an operation referred to as "thickness sorting", which consists in determining the zones of the part having the smallest thicknesses and in protecting them by applying a coating. That operation is mainly performed manually. Thereafter, between the protected zones, excess material is removed by chemical machining, which consists in keeping the part for a determined duration in a bath of acid suitable for etching the metal. Thereafter, the part is reworked manually by local and iterative polishing of out-of-tolerance zones that present defects of appearance and traces of the chemical machining. This operation comprises "first" appearance polishing. Where necessary, the part may be reworked manually in order to bring its shape into the required tolerances.

Finally, automatic polishing known as "final" appearance polishing serves to ensure that the aerodynamic profile is continuous and that the surface state is suitable for ensuring a proper flow of the air stream. Automatic polishing is generally performed using an abrasive band. For example, a band is used having abrasive material constituted by silica carbide. The band is mounted on a wheel that is driven to rotate tangentially relative to the surface of the part. Movement of the wheel relative to the surface is controlled by a program that takes account of the shape of the surface to be polished. Polishing parameters such as the travel speed of the abrasive band over the surface, the travel speed of the wheel relative to the part, and also the pressure exerted on the surface and the grit of the abrasive material are all determined so as to remove the required thickness of material and achieve the desired surface shape. A description of an abrasive band polishing machine is to be found in U.S. Pat. No. 5,193,314.

The above-described manual operations are arduous for operators, particularly when they need to work on parts that are heavy, such as turbojet fan blades, and that need to be checked.

Patent application WO 2010/149720 in the name of the Applicant seeks to replace those manual operations by automatic operations, thereby relieving the operators.

The method described in that patent application consists in:
making a semi-finished part by forging;
measuring the geometrical characteristics of the semi-finished part;
comparing the measured shape of the semi-finished part with a theoretical shape that is to be obtained for the part, and deducing therefrom zones that are not in compliance with the theoretical shape and also the thicknesses of material that need to be removed from said zones that are not in compliance; and
polishing the zones of the semi-finished part that are not in compliance so as to remove the desired thicknesses of material by using a controlled abrasive band.

The band is controlled by varying the speed of advance of the part relative to the abrasive band, while the other polishing parameters are kept constant.

A relationship is established between the thickness of the material to be removed, also referred to as the "removal", and the above-mentioned relative speed of advance. This relationship is established by measurements and/or by calculation, and it makes it possible, for each of the zones that are not in compliance and that need to be machined, and on the basis of a desired removal, to determine the speed of advance that is to be applied. The slower the speed of advance, the greater the amount of material that is removed.

It has been found that the shape of the part obtained after adaptive polishing still presents relatively large dimensional departures from the theoretical shape of the part to be obtained.

A particular object of the invention is to provide a solution to this problem that is simple, effective, and inexpensive.

To this end, the invention provides a method of fabricating a part by forging, the method comprising the steps consisting in:
making a semi-finished part by forging;
measuring the geometrical characteristics of the semi-finished part;
comparing the measured shape of the semi-finished part with a theoretical shape that is to be obtained for the part, and deducing therefrom zones that are not in compliance with the theoretical shape and also the thicknesses of material that need to be removed from said zones that are not in compliance, which parameter is selected from the following parameters: the distance traveled by the abrasive band while polishing preceding zones; the mean speed of advance of the part relative to the abrasive band while polishing the preceding zones; the mean travel speed of the abrasive band while polishing the preceding zones; and the duration of polishing the preceding zones; and
polishing the zones of the semi-finished part that are not in compliance so as to remove the desired thicknesses of material by using a controlled abrasive band;
the method being characterized in that the control of the abrasive band takes account of at least one parameter representative of the wear of the abrasive band during polishing of zones that are not in compliance.

Taking account of wear while controlling the abrasive band makes it possible, after adaptive polishing, to obtain parts that present a shape that is close to the theoretical shape that is to be obtained.

The Applicant has observed that the progressive wear of the abrasive band while it is polishing zones that are not in compliance has an influence on the thickness of material that it removes during polishing. This observation has not been made until now.

One or more parameters representative of the above-mentioned wear may be taken into account in order to control the abrasive band.

Preferably, the control of the abrasive band includes controlling the speed of advance of the part relative to the abrasive band.

Under such circumstances, the travel speed of the abrasive band and the pressing force exerted by the abrasive band on the part may be constant during polishing.

The machines used for the polishing have a response time that is shorter when it comes to changing the speed of advance than when changing the travel speed of the band (a function of the speed of rotation of the wheel driving the band), or when changing the pressing force exerted by the abrasive band.

It is thus preferable to control the parameter for which the change presents the shortest response time.

According to another characteristic of the invention, for each type of semi-finished part to be polished, charts or mathematical relationships are determined beforehand seeking to determine the speed of advance of the part relative to the abrasive band as a function of the thickness of material to be removed in the zone that is not in compliance and as a function of at least one parameter representative of the wear of the band while polishing zones that are not in compliance.

These charts or mathematical relationships make it possible, by reading or by calculation, to deduce the speed of advance to be adopted as a function of the desired removal, while also taking account of the wear of the band.

Preferably, the charts or mathematical relationships seek to determine the speed of advance of the part relative to the abrasive band as a function of the thickness of material to be removed in the zone that is not in compliance, of the mean speed of advance of the part relative to the abrasive band while polishing the preceding zones, and of the distance traveled by the abrasive band while polishing the preceding zones.

Advantageously, the charts or the mathematical relationships are determined by calibration from parts that are of the same type as the part to be polished and that have already been subjected to polishing using an abrasive band of the same type, for which the thicknesses of material removed have been measured in various zones and for which the machining parameters of said zones are known, the measurements and the machining parameters defining a set of points.

By way of example, two parts are of the same type when they are made of the same material, and two bands are of the same type when their abrasive grit presents hardness and grain size that are similar, for example.

According to a characteristic of the invention, the method consists in interpolating from measured points so as to join them together by mathematical functions, e.g. such as polynomial functions or affine functions.

Such interpolation makes it possible using a small number of points to determine the relationships or intermediate points suitable for use in determining the speed of advance of the part relative to the abrasive band for various different thicknesses of material to be removed and for different values for the various parameter(s) representative of the wear of the strip.

By way of example, it has been found that polynomial functions make it possible, by approximation, to calculate the removal as a function of the prior speed of advance, of the prior distance traveled, or indeed of the prior mean speed of advance. From a few points measured on parts that have already been polished, interpolation makes it possible to determine the various coefficients of these polynomial functions. Once the functions have been defined, any one of the parameters may be calculated from the other parameters. As explained above, the input parameters are preferably: the desired removal; the prior mean speed of advance; and the distance already traveled by the abrasive band. The output parameter as calculated from the input parameter is preferably the relative speed of advance that is used for controlling the abrasive band.

According to another characteristic of the invention, the part is also subjected to final polishing seeking to remove a uniform thickness of material over at least a portion of the part.

By way of example, the part is a turbine engine blade.

The invention can be better understood and other details, characteristics, and advantages of the invention appear on reading the following description made by way of non-limiting example and with reference to the accompanying drawings, in which.

Figure 1:
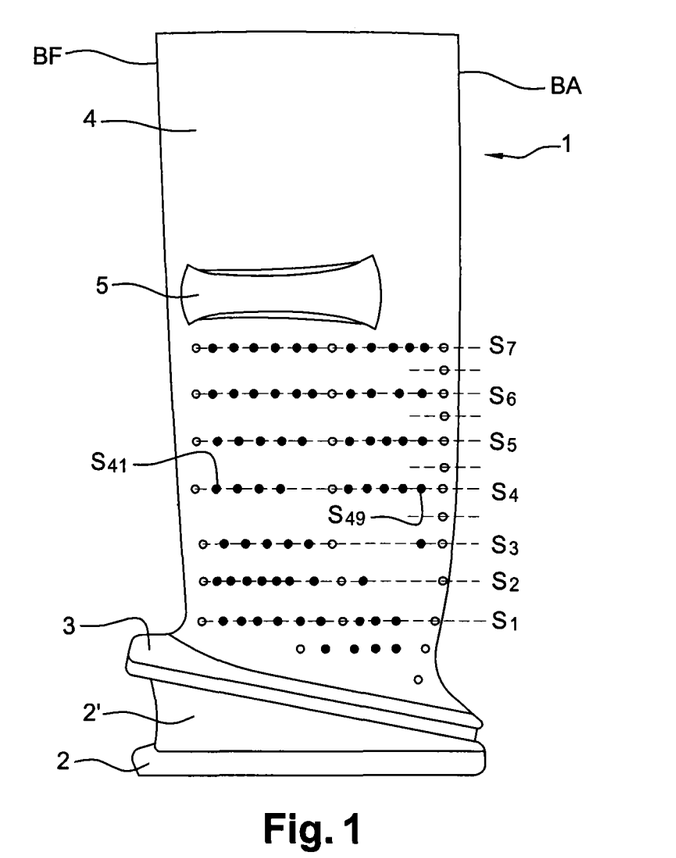
FIG. 1 is a diagrammatic profile view of a turbine engine blade.

FIG. 1 shows a semi-finished fan blade 1 of a turbojet that extends radially, the blade being made of titanium alloy and being made by precision forging. The blade 1 has a bulb 2, a tang 2', a platform 3 (where the bulb 2, the tang 2', and the platform 3 together form the root), and an airfoil 4 that is designed to be swept by the air penetrating into the turbojet. Intermediate fins or spacers 5 project from the pressure side and suction side surfaces of the blade 4 in order to form bearing surfaces for adjacent blades 1.

The pressure side face and the suction side face extend between a leading edge BA and a trailing edge BF and they join together along those edges.

A plurality of sections of the blade are shown in FIG. 1. These sections $S_1$ to $S_7$ are mutually parallel and they are spaced apart from one another along the longitudinal axis of the blade (stacking axis). The positions of the sections are defined relative to one or more reference planes, e.g. of the bulb 2 of the blade root. Points are defined on the pressure side and suction side surfaces level with each of the sections $S_1$ to $S_7$. It is thus possible to define the shape of the airfoil 4 by the three-dimensional coordinates for these points.

In the example shown, the portion of the airfoil 4 situated between the platform 3 and the fin or spacer 5 of the pressure side is defined by seven sections referenced $S_1$ to $S_7$. Points are referenced on the surface of the airfoil 4 along each of these sections between the trailing and leading edges BF and BA. For example, on the section referenced $S_4$ there are points referenced $S_{41}$ to $S_{49}$ between the trailing edge BF and the leading edge BA. As in the prior art, the method begins by using a three-dimensional measurement robot to measure the geometrical characteristics of the semi-finished blade 1 obtained by forging.

In patent EP 1 596 156, the Applicant has described an example of the method and the equipment enabling the geometrical characteristics of a plurality of points distributed over the surface of a blade to be measured simultaneously. Three-dimensionally measuring the coordinates of a set of predetermined points on the surface of a mechanical part relative to a predetermined frame of reference comprises:

- a preparatory stage, in which the coordinates of the predetermined points on the surface of a first mechanical part that constitutes a reference part are measured simultaneously;
- an initialization stage, in which linear measurements are taken of movements along the normals to the points of said reference part;
- a measurement stage, in which linear measurements are taken of movements over the points of the part for measuring that correspond to the points of the reference part; and
- a calculation stage, in which the three-dimensional coordinates of the points of the part for measuring are calculated on the basis of the three-dimensional coordinates of the points of said reference part, on the basis of the linear measurements, and on the basis of direction cosines for the theoretical normals at those points.

By means of this calculation, which is performed at each of the measurement points on the predefined sections, it is possible to identify zones that are not in compliance, i.e. zones that present extra thickness at the points under consideration, while taking account of a shape defect of the part, if any.

It is also possible, instead of using a real reference part, to make use of a geometrical shape that is to be obtained as generated by computer-aided design (CAD) software.

For each of the zones that are not in compliance, a thickness is thus obtained for the amount of material to be removed in order to make these zones comply. This thickness of material is also referred to as the removal.

Figure 3:
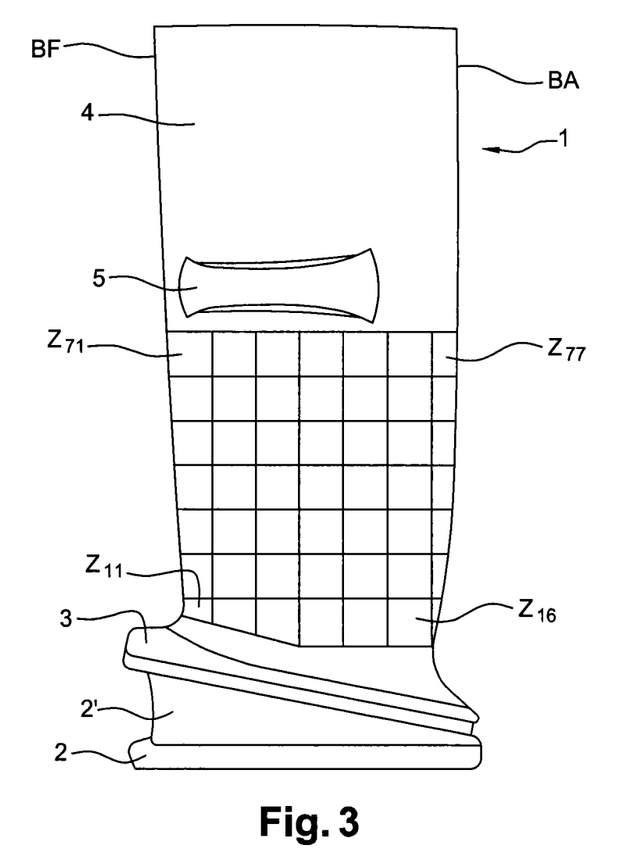
FIG. 3 is a profile view of the blade, with a grid (being applied to a portion of the surface of the blade) for mapping zones that require material to be removed.

After the removals have been determined, the method of the invention comprises making a map of the removals. For this purpose, the surfaces for polishing are subdivided into zones $Z_{11}, \ldots, Z_{77}$ that may either be in compliance or else not in compliance. For each of the zones that are not in compliance, the map gives the value of the amount of material or "stock" that needs to be removed in order to bring the blade into compliance.

The surfaces of the airfoil 4 are then polished in an automatic machine that removes material as a function of the map that has been established.

Figure 2:
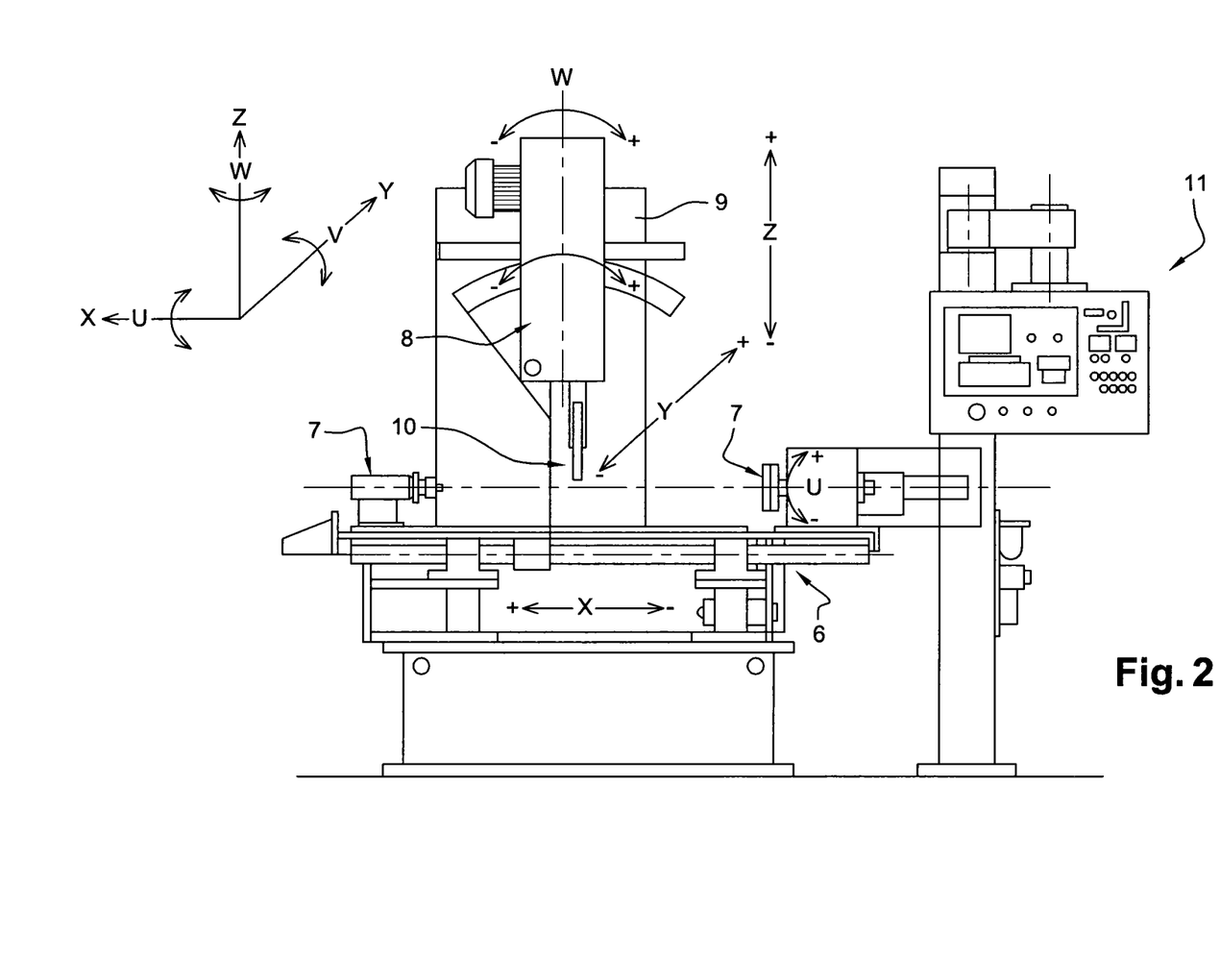
FIG. 2 shows an abrasive band polishing machine.

With reference to FIG. 2, there follows a description of an example of a polishing machine used for performing the method of the invention.

The machine 1 shown in FIG. 2 is commercially available from the supplier IBS. A bench 6 has two chucks 7 between which the blade 1 is held horizontally. The assembly formed by the blade 1 and its support can move in this direction X or can rotate about this axis in the direction U under drive from electric motors. Above the bench, a head 8 is mounted on a vertical pylon 9 and can move along its axis Z. The head 8 can also pivot about the axis Z, as indicated by arrow W. Motors are provided for driving the head in both directions. Finally, the head 8 can move horizontally in the direction Y that is perpendicular to the direction X and it can pivot about this axis in the direction V. These movements are motor-driven. The head 8 supports a contact wheel 10 that is rotatable about an axis that is stationary relative to the head. A motor mounted on the head 8 drives the wheel 10 with the help of an abrasive band that is mounted on the periphery of the wheel 10. The motors are connected to a control panel that includes a control unit 11 having programming means and memories including in particular data concerning the geometrical characteristics of the blade for polishing. In order to polish the blade, the band is applied locally, tangentially to its surface, while exerting a determined amount of pressure and while causing the band to move, thereby causing it to rotate with the wheel 10.

The value of the removal and the resulting surface state depend on several parameters, such as in particular:

- the grit of the abrasive band;
- the travel speed of the band as a result of the wheel 10 rotating about its axis;
- the pressure of the band against the surface of the blade as exerted by the wheel 10; and
- the relative speed of advance of the band along the blade, which in this example is the speed of advance of the bench, i.e. of the blade, relative to the band along the axis X.

In the implementation described below, zones that are not in compliance are polished by controlling the relative speed of advance between the blade and the polishing band, preferably while keeping constant the contact pressure and the speed of rotation of the band (also referred to as the travel speed of the band). The machine is controlled on the basis of the map of the stock removals. For the machine, this map is converted into a map of speeds of advance of the blade relative to the polishing band.

In order to ensure that the shape of the blade obtained after polishing is in compliance with the desired shape, it is necessary for the control of the abrasive band to take account of at least one parameter that is representative of the wear of the abrasive band during polishing.

In the example below and for each of the zones for polishing that are not in compliance, the abrasive band is controlled while taking account of the distance that has been traveled by the abrasive band while polishing preceding zones (referred to herein as the distance traveled or the prior distance) and of the mean speed of advance of the blade relative to the abrasive band while polishing preceding zones (referred to below as the prior mean speed).

The relationships between these parameters are obtained from charts or from mathematical relationships seeking to determine the speed of advance of the blade relative to the abrasive band as a function of the removal desired in the zone that is not in compliance, of the prior mean speed, and of the prior distance.

The way in which the charts are formed and the way in which the mathematical relationships between these various parameters are obtained are described below. Thereafter it is explained how the value for the speed of advance of the blade relative to the band can be deduced from the above-mentioned charts or mathematical relationships.

The charts or the mathematical relationships are determined on the basis of blades that are of the same type as the blades for polishing and that have already been subjected to polishing using an abrasive band of the same type, for which the removals have been measured in the various zones, and for which the machining parameters in said zones are known, with the measurements and the machining parameters defining a set of points.

The blades are of the same type, e.g. when they are made out of the same material, and two bands are of the same type, e.g. when they have abrasive grits presenting similar hardness and grain size.

For each of these points, the following are defined: the speed of advance of the blade relative to the abrasive strip (referred to below as the speed of advance); the prior mean speed; the removal achieved; and the prior distance.

For a given speed of advance (V), and for a given prior distance (D), it may for example be considered, as an approximation, that the removal (E) depends on the prior mean speed (written VMA) in application of a second degree polynomial relationship. In other words, for constant D and V, $E=f_1$(VMA) where $f_1$ is a polynomial function of the type $a_2x^2+a_1x+a_0$. Knowing a plurality of points that lie on this curve, an interpolation operation makes it possible to calculate the coefficients $a_2$, $a_1$, and $a_0$ (known as the coefficients of the polynomial function), and to deduce therefrom the function $f_1$.

Likewise, for a given speed of advance (V) and for a given prior mean speed (VMA), it is possible as an approximation to consider that the removal (E) depends on the prior distance (D) in application of a second degree polynomial relationship having coefficients that can be determined by interpolation from a plurality of known points.

In addition, for a given prior distance (D) and for a given prior mean speed (VMA), it is possible as an approximation to consider that the removal (E) depends on the speed of advance in application of a second degree polynomial relationship having coefficients that can be determined by interpolations from a plurality of known points.

By proceeding in this way by interpolation, it is possible to define charts that, for a determined speed of advance (V), give the removal (E) as a function of the prior mean speed (VMA) and of the prior distance (D). Other curves may also be obtained, the relationships that enable the various parameters to be associated being presently known.

It should be observed that removal decreases as prior distance D increases. The amount of removal achieved becomes smaller as the wear of the band increases, and this wear increases with increasing prior distance D. Likewise, the removal E decrees with increasing prior mean speed VMA and with increasing relative speed of advance V.

Since the abrasive band is controlled in relative speed of advance, it is appropriate to determine what relative speed of advance V should be applied for a zone for polishing that is not in conformity in order to obtain the looked-for removal E in that zone.

Figure 4:
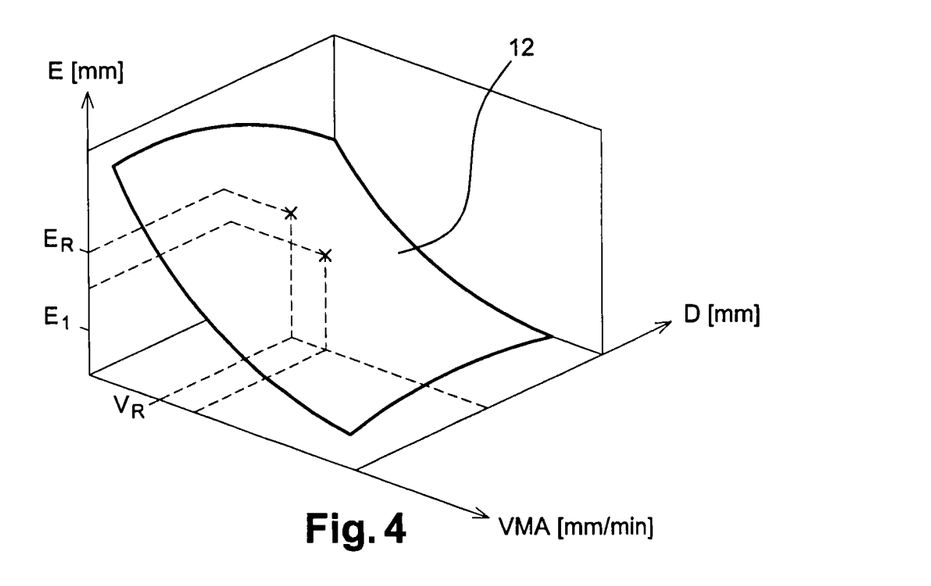
FIG. 4 is a three-dimensional plot for a given relative speed of advance showing removal as a function of the prior distance and the prior mean speed of advance.

For this purpose, one method consists in using the curves 12 shown in FIG. 4. The distance traveled by the band before reaching the zone, i.e. the prior distance D is easily determined, as is the prior mean speed VMA. It is therefore appropriate to read from the curve 12 the removal $E_1$ that corresponds to this distance traveled D and to this prior mean speed VMA. This removal E corresponds to a given relative speed of advance $V_1$.

Figure 5:
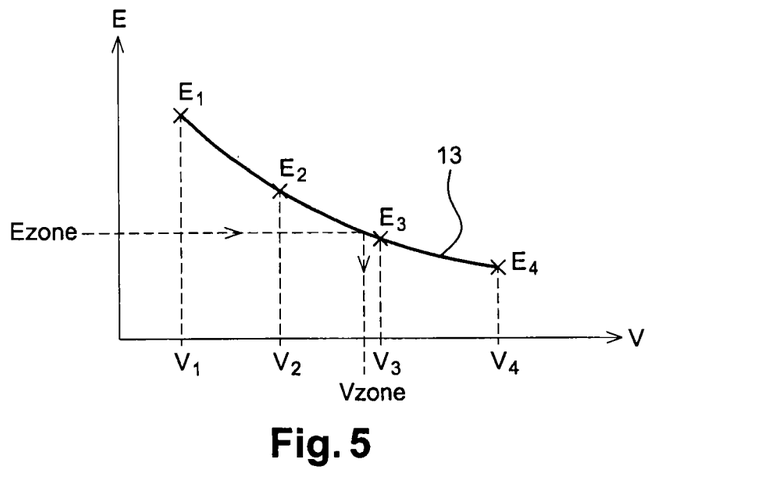
FIG. 5 is a two-dimensional plot for a given prior mean speed of advance and a given prior distance, showing removal as a function of the speed of advance of the workpiece relative to the abrasive band.

The same procedure is applied for a plurality of different speeds ($V_1$, $V_2$, $V_3$, $V_4$). The values $E_1$, $E_2$, $E_3$, $E_4$ corresponding respectively to the speeds $V_1$, $V_2$, $V_3$, $V_4$ are plotted on a graph (FIG. 5), and the curve 13 corresponding to the polynomial function passing through these points (e.g. a second degree polynomial function) is obtained by interpolation. All that then remains to be done is to determine the value of the relative speed of advance ($V_{zone}$) to be applied to the zone that corresponds to the looked-for removal from the zone ($E_{zone}$). By way of example, this removal may lie in the range 0.2 mm to 0.7 mm.

Naturally, such readings are not taken manually from the charts by an operator, but rather these calculation operations are performed by the calculation means of the machine, and the results that are obtained are forwarded to the control means 11 for driving the polishing machine.

The plots described herein serve merely to represent the phenomena involved. The various values of the parameters and the functions may be calculated directly by the calculation means of the machine, without necessarily having recourse to preparing such plots.

Once the value $E_1$ has been read for a speed $V_1$, another method that is more approximate consists in comparing $E_1$ with the looked-for removal value $E_R$. As a general rule, this removal $E_1$ will not correspond exactly to the value of the looked-for removal $E_R$. As an approximation, it is possible (for the known prior distance D) to determine a new value of speed along the VMA axis, written $V_R$, that corresponds to the looked-for removal $E_R$ on the basis of the three-dimensional curve. This speed $V_R$ may be used as the relative speed of advance for driving the abrasive band. This method is faster but also less accurate than the method described above. Nevertheless, it is found to suffice for making blades of shapes that need to comply with the dimensional tolerances that are presently in use.

After this adaptive polishing that takes account of the wear of the band, the blade may subsequently be subjected to final polishing using an abrasive band with finer grit, seeking to remove a uniform thickness of material over at least a portion of the airfoil in order to smooth out any defects of appearance. Under such circumstances, allowance must be made for a corresponding extra thickness, e.g. of the order of 0.7 mm.

The invention claimed is:

1. A method of fabricating a part by forging, the method comprising:
    making a semi-finished part by forging;
    measuring geometrical characteristics of the semi-finished part;
    comparing a measured shape of the semi-finished part with a theoretical shape that is to be obtained for the part, and deducing therefrom zones that are not in compliance with the theoretical shape and also thicknesses of material that need to be removed from the zones that are not in compliance; and
    polishing the zones of the semi-finished part that are not in compliance so as to remove the deduced thicknesses of material by using a controlled abrasive band;
    wherein control of the abrasive band takes account of at least one parameter representative of wear of the abrasive band during polishing of zones that are not in compliance, which parameter is selected from the following parameters: a distance traveled by the abrasive band while polishing preceding zones; mean speed of advance of the part relative to the abrasive band while polishing the preceding zones; mean travel speed of the abrasive band while polishing the preceding zones; and duration of polishing the preceding zones.

2. A method according to claim 1, wherein the control of the abrasive band includes controlling a speed of advance of the part relative to the abrasive band.

3. A method according to claim 2, wherein the travel speed of the abrasive band and a pressing force exerted by the abrasive band on the part are constant during polishing.

4. A method according to claim 1, wherein for each type of semi-finished part to be polished, charts or mathematical relationships are determined beforehand seeking to determine a speed of advance of the part relative to the abrasive band as a function of the thicknesses of material to be removed in the zone that is not in compliance and as a function of at least one parameter representative of the wear of the band while polishing zones that are not in compliance.

5. A method according to claim 4, wherein the charts or mathematical relationships seek to determine the speed of advance of the part relative to the abrasive band as a function of the thicknesses of material to be removed in the zone that is not in compliance, of the mean speed of advance of the part relative to the abrasive band while polishing the preceding zones, and of the distance traveled by the abrasive band while polishing the preceding zones.

6. A method according to claim 4, wherein the charts or the mathematical relationships are determined from parts that are a same type as the part to be polished and that have already been subjected to polishing using an abrasive band of a same type, for which the thicknesses of material removed have been measured in various zones and for which the machining parameters of the zones are known, the measurements and the machining parameters defining a set of points.

7. A method according to claim 6, further comprising interpolating from measured points to join them together by mathematical functions, or polynomial functions, or affined functions.

8. A method according to claim 1, wherein the part is further subjected to a final polishing to remove a uniform thickness of material over at least a portion of the part.

9. A method according to claim 1, wherein the part is a turbine engine blade.

* * * * *